United States Patent [19]

Loonen

[11] Patent Number: 5,221,878
[45] Date of Patent: Jun. 22, 1993

[54] IMAGE PICK-UP SYSTEM

[75] Inventor: Antonie R. M. Loonen, Eindhoven, Netherlands

[73] Assignee: U.S. Philips Corporation, New York, N.Y.

[21] Appl. No.: 795,423

[22] Filed: Nov. 20, 1991

[30] Foreign Application Priority Data

Nov. 30, 1990 [NL] Netherlands .......................... 9002620

[51] Int. Cl.⁵ .......................... H01J 29/70; H01J 29/76
[52] U.S. Cl. .................................. 315/399; 335/214; 335/213
[58] Field of Search .................. 315/399; 335/213, 214

[56] References Cited

U.S. PATENT DOCUMENTS 2,143,933 1/1939 Barthelemy et al. .
2,222,934 11/1940 Blumlein et al. .
4,337,448 6/1982 Van Rooy ............................ 335/214

Primary Examiner—Theodore M. Blum

[57] ABSTRACT

A television pick-up tube in an image pick-up system comprises an high-frequency magnetic deflection element which deflects the electron beam perpendicularly to the line direction in the television pick-up tube. As a result, residual charge remaining between the image lines on the target face of the television pick-up tube is neutralized. Inductive coupling of the high-frequency deflection element to the power supply increases the resonance frequency of the deflection element, so that the deflection element can operate at a frequency which exceeds the video signal frequency so that it does not interfere therewith.

4 Claims, 3 Drawing Sheets

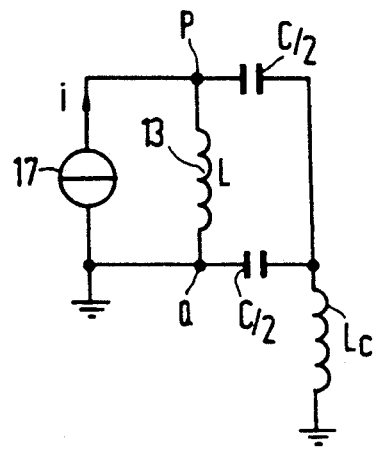
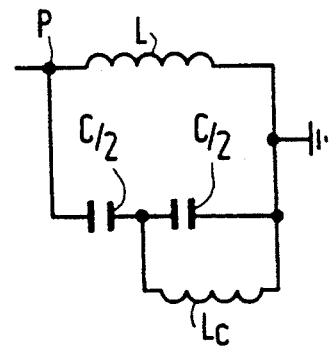
FIG.5a  FIG.5b
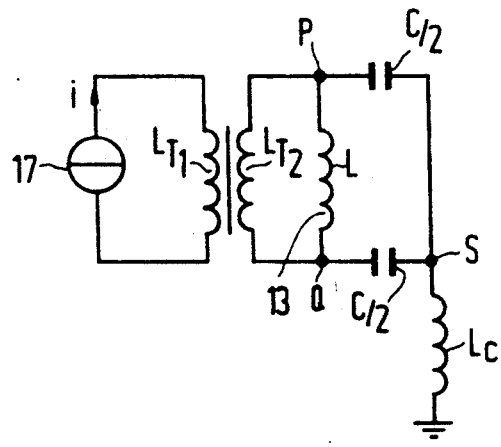
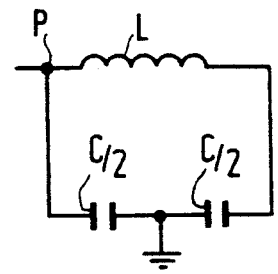
FIG.6a  FIG.6b

006
IMAGE PICK-UP SYSTEM

BACKGROUND OF THE INVENTION

The invention relates to an image pick-up system, comprising a television pick-up tube and a deflection voltage generator which is connected to the television pick-up tube, the television pick-up tube comprising an electron source for emitting an electron beam to an image pick-up face, a horizontal deflection device for deflecting the electron beam across the image pick-up face along an image line, and a vertical deflection device for deflecting the electron beam in a direction transversely of the image line, the vertical deflection device comprising a first deflection element and a second deflection element which is of an electromagnetic type and which operates at a frequency which is higher than that of the first deflection element.

An image pick-up system of this kind is described in the not previously published Netherlands Patent Application No. 9001171, corresponding to U.S. patent application Ser. No. 699,853 filed on May 14, 1991, in the name of Applicant. The cited Patent Application describes a television pick-up tube which comprises deflection coils for deflecting the electron beam across an image pick-up face in two mutually perpendicular directions. The image pick-up face is scanned, for example line-wise, an image being composed of two interlaced fields comprising 312.5 lines each. For deflection of the electron beam the deflection coils receive a sawtooth voltage, a frequency of the sawtooth voltage across the coil for deflection in the vertical direction amounting to, for example 50 Hz while a frequency of the sawtooth voltage across the coil for deflection in the horizontal direction amounts to 15.6 kHz.

When use is made of a television pick-up tube whose image pick-up face is large in comparison with the beam diameter of the electron beam, for example as in medical imaging systems comprising a chain including an X-ray image intensifier tube and a television pick-up tube, charge is liable to remain between the image lines on the image pick-up face, which charge is not compensated for by the electron beam. A positive charge accumulation attracts the electron beam in an undesirable manner so that an annoying local flicker effect occurs in the television image when the image is displayed on a television monitor. In order to counteract this effect, the vertical deflection device comprises a second deflection element which is of an electromagnetic type and which operates at deflection frequencies which are higher than those of the first deflection element of the vertical deflection device. The second deflection element periodically deflects the electron beam between transverse positions, situated to both sides of an image line, during deflection of the electron beam along the image line. The electron beam follows an undulating path around an image line across the image pick-up face under the influence of a deflection voltage of comparatively high frequency (for example, 50 MHz) applied to the second deflection element. Thus, the charge accumulated on the image pick-up face between two neighbouring image lines is compensated for and negative effects due to charge accumulation are counteracted without affecting the image resolution to a significant extent.

The video signal generated by the television pick-up tube has a frequency in the order of magnitude of 9 MHz in the case of display of images which are composed of, for example two interlaced fields comprising 312.5 image lines each with a frequency of 25 Hz (field frequency is 50 Hz). For high-resolution images (double the number of lines), the video frequency is 18 MHz. These video signals are amplified by means of a video amplifier which has a cutoff frequency beyond 18 MHz.

The second deflection element, being formed, for example by a saddle-shaped coil, can constitute, by way of capacitive coupling to the environment, a resonant circuit which has a comparatively low resonance frequency and below this resonance frequency it is liable to interfere with the video signal generated by the television pick-up tube. This occurs inter alia when signals of the deflection element are amplified by the video amplifier. Beyond the resonance frequency the behaviour of the second deflection element is capacitive, so that the deflection frequency cannot exceed the resonance frequency.

SUMMARY OF THE INVENTION

It is an object of the invention to provide an image pick-up system in which this drawback does not occur. To achieve this, an image pick-up system in accordance with the invention is characterized in that a deflection voltage generator (18) comprises an AC supply source (17), a first coil ($L_{T1}$) whose terminals are connected to terminals of the AC supply source (17), and a second coil ($L_{T2}$) whose terminals are connected to terminals of the second deflection element (13), the first and the second coil being inductively coupled to one another.

When the AC supply source, for example a current source, is connected to the second deflection element via two inductively coupled coils, the second deflection element constitutes, in conjunction with the capacitive coupling to the environment, a resonant circuit which can be represented as a network of a coil which is connected parallel to two series-connected capacitors. The junction of the two capacitors carries a fixed reference voltage. The resonance frequency of this network is at least $\sqrt{2}$ times higher than the resonance frequency of the circuit formed when the second deflection element is connected directly to the supply voltage source. In the latter case the network is formed by a coil connected parallel to a series connection of two capacitors, one junction of a capacitor and the coil carrying a fixed reference voltage. Furthermore, as a result of the connection of the supply voltage source to the second deflection element via an inductive coupling of two coils, the adverse effect on the resonance frequency due to an inductive component of the coupling between the second deflection element and the environment is counteracted. Because no current flows to the reference voltage (ground) via to this inductive coupling, the crosstalk on the video signal is reduced.

An embodiment of an image pick-up system in accordance with the invention is characterized in that the second deflection element (13) is capacitively coupled to a current-conductive shielding electrode (16) which is connected to a reference voltage.

The second deflection element is, for example a current-conductive strip which is arranged on a cylindrical envelope of the electron beam. Coaxially with the second deflection element and around the cylindrical envelope there are arranged the first deflection element of the vertical deflection device, the horizontal deflection device and a focusing device, said devices being formed, for example by saddle-shaped coils. In order to prevent crosstalk between the high-frequency second deflection element of the vertical deflection device and the other deflection and focusing devices, a current-conductive shielding electrode is arranged around the second deflection element, which shielding electrode is connected to a reference voltage terminal carrying, for example ground potential. When the supply voltage source is coupled directly to the second deflection element, a terminal of the supply voltage source also being connected to the reference voltage terminal, a current will flow to the reference voltage terminal due to capacitive coupling of the second deflection element and the shielding electrode. This is prevented by coupling the supply voltage source to the second deflection element via two inductively coupled coils, so that a resonance frequency of the second deflection element remains comparatively high.

Preferably, the image pick-up system in accordance with the invention is used in an X-ray examination apparatus comprising an X-ray image intensifier tube, an exit window of which is coupled to the television pick-up tube. For high-resolution X-ray images, use is preferably made of a television pick-up tube having an image pick-up face which has a diameter of 2 inches and is scanned along 1250 image lines. In order to prevent image-disturbing charge accumulation between the image lines when the image pick-up face is scanned along 625 image lines, being carried out if no high-resolution X-ray images are desired, use is made of a vertical deflection device comprising a second, high-frequency deflection element which is controlled by a deflection voltage unit in accordance with the invention.

BRIEF DESCRIPTION OF THE DRAWING

Some embodiments of an image pick-up system in accordance with the invention will be described in detail hereinafter with reference to the accompanying drawing.

Therein:

FIGS. 5a and 5b show the electrical network formed by the second deflection element and the shielding electrode in the case of conductive connection to a supply voltage source; and FIGS. 6a and 6b show the electrical network formed by the second deflection element and the shielding electrode in the case of inductive coupling to a supply voltage source.

DESCRIPTION OF THE PREFERRED EMBODIMENTS

Figure 1:
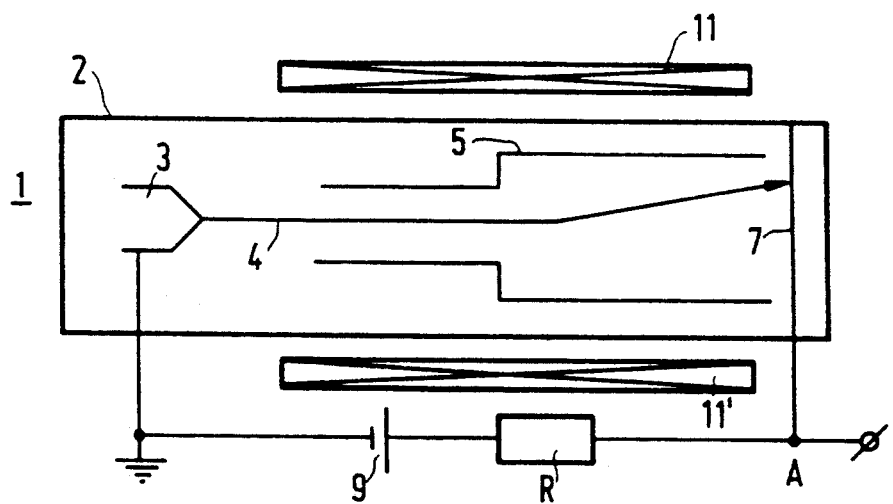
FIG. 1 diagrammatically shows a known television pick-up tube.

FIG. 1 shows a known television pick-up tube 1 comprising, situated within an envelope 2, an electron source 3 and focusing electrodes 5. An electron beam 4 to be emitted by the electron source 3 is imaged on an image pick-up face 7 by means of the focusing electrodes 5. A focusing effect can also be obtained by using a coil (not shown in the Figure) which is situated outside the envelope 2 instead of the focusing electrodes 5. The image pick-up face 7 comprises a layer of a photoconductive material, for example PbO, on which a charge pattern is built up which is dependent on the local light intensity on the image pick-face 7. In pixels of the image pick-up face 7 a positive charge is accumulated across an intrinsic capacitance of the photoconductive layer. When the electron beam 4 is incident on a pixel, the pixel is discharged to the cathode potential which amounts to 0 V in the present example. As a result, a voltage drop occurs across the resistor R with respect to the voltage source 9 which has a terminal voltage of, for example 30 V. This voltage drop is extracted at the point A and constitutes the video signal which can be displayed on a monitor. The electron beam 4 is deflected across the image pick-up face 7 by means of a horizontal deflection device 11 and a vertical deflection device 11' which are formed by magnetic deflection devices in the present embodiment but, for example at least one of which can be replaceabled by an electrostatic deflection device situated within the envelope 2.

Figure 2A:
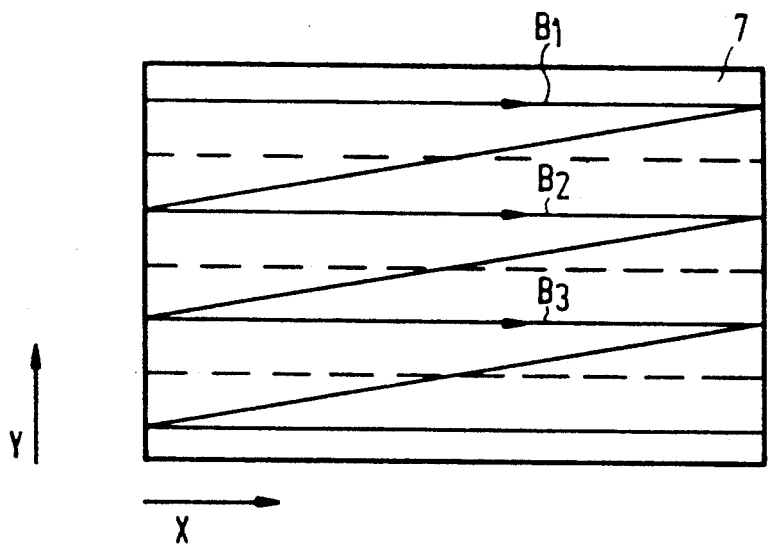
FIGS. 2a and 2b show a path of the electron beam across an image pick-up face.

FIG. 2a shows the path traversed by the electron beam 4 across the image pick-up face 7. The electron beam moves along image lines B from a first to second edge of the image pick-up face 7 under the influence of a magnetic field generated by the horizontal deflection device 11. A self-inductance of the horizontal deflection device 11 amounts to, for example 1 nH. After having been moved along an image line B1, the electron beam is displaced in a transverse direction (denoted by the letter Y in the Figure) by means of the vertical deflection device 11', so that the electron beam is situated at the beginning of the image line B2 on the image pick-up face. A self-inductance of the vertical deflection device 11' is, for example between 1 and 30 nH. In the case of an image which is composed of two interlaced image fields, denoted by the non-interrupted line and the interrupted lines in FIG. 2a and comprising 312.5 lines each, a deflection frequency in the Y direction amounts to 50 Hz and a deflection frequency in the direction of the image lines (X direction) amounts to $50 \times 312.5 = 15.6$ kHz. The two deflection devices 11 and 11' are coils adapted to said frequencies.

Figure 2B:
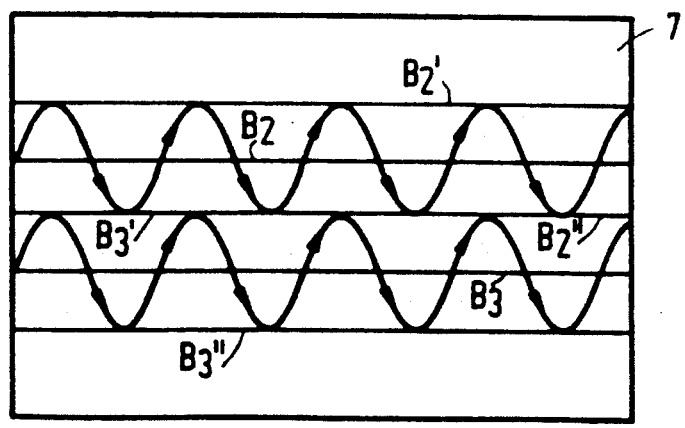

When the image lines B are spaced comparatively far apart in comparison with a beam diameter of the electron beam 4, a positive charge will remain between the image lines. This problem occurs notably in an X-ray examination apparatus in which an image intensifier tube cooperates with a television pick-up tube having a comparatively large image pick-up face (a diameter of 2 inches). For high-resolution X-ray images, the image pick-up face is scanned along, for example 1250 image lines, whilst for medical examinations requiring a lower resolution the image pick-up face is scanned along 625 image lines. In the latter case charge accumulation occurs between the image lines, so that the electron beam is undesirably deflected and annoying brightness fluctuations occur in the television image. This negative effect can be counteracted by deflecting the electron beam 4 along a path across the image pick-up face 7 as shown in FIG. 2b. In order to achieve such deflection, the vertical deflection device 11' comprises a magnetic high-frequency deflection element so that an additional deflection frequency in the Y-direction amounts to, for example from 50 to 75 MHz. At this frequency the number of excursions of the electron beam between the transverse positions B' and B'', situated to both sides of an image line B, amounts to from 1600 to 2400.

Figure 3:
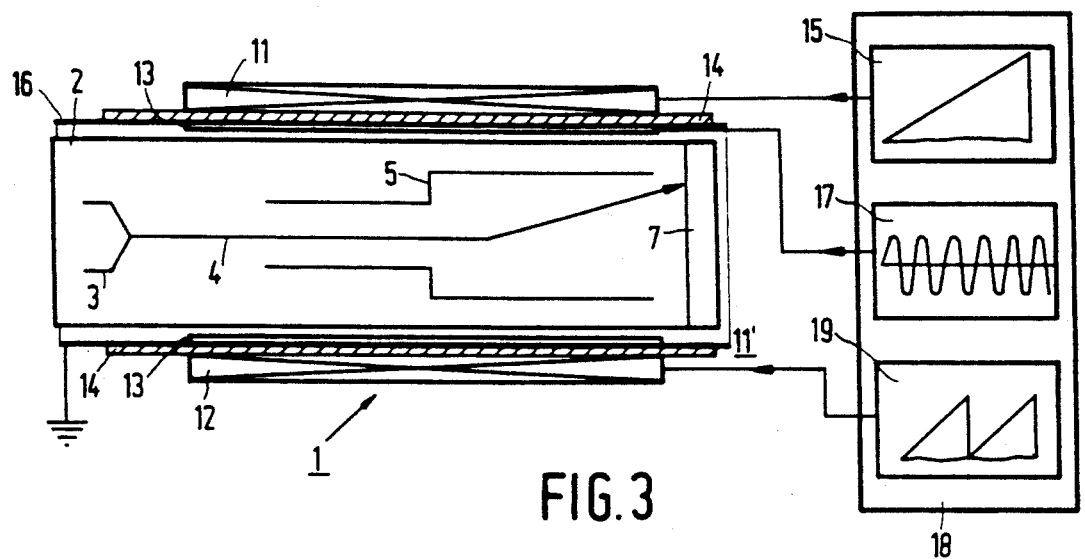
FIG. 3 shows an image pick-up device comprising a second deflection element and a deflection voltage unit.

FIG. 3 shows an image pick-up system in which the second deflection element 13 of the vertical deflection device 11' is arranged around the envelope 2 and secured, for example to an inner side of a cylindrical support 14. The deflection element 13 is connected to an oscillator 17 of a deflection voltage unit 18. The oscillator 17 has a high frequency with respect to sawtooth generators 15 and 19 connected to the horizontal deflection device 11 and the first deflection element 12 of the vertical deflection device 11'.

Figure 4:
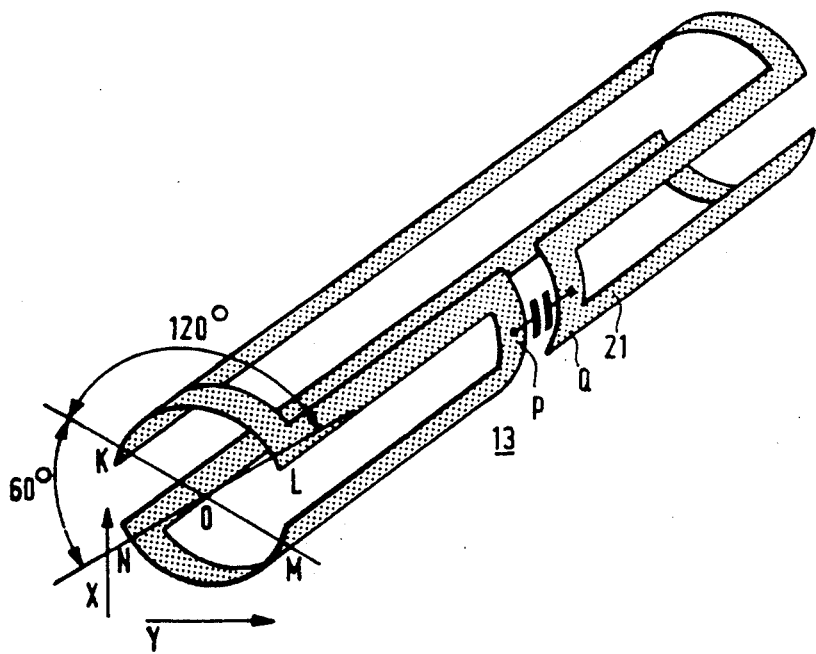
FIG. 4 shows an embodiment of the second deflection element.

A further magnetic deflection element 13 of the kind shown in FIG. 4 is very suitable for mounting between the envelope 2 the television pick-up tube, the horizontal deflection device 11 and the first deflection element 12 of the vertical deflection device 11'. The saddle-shaped coil 13, having a self-inductance of, for example 200 nH, comprises a conductive strip 21 which is disposed on a cylindrical surface. In order to obtain a homogeneous magnetic field in the line direction (denoted by the letter X in the Figure), the saddle-shaped coil preferably has a configuration where the strip is situated, viewed in a radial cross-section of the cylindrical surface, on a circle at the points K, L, M and N. Radii connecting the points K, L, M and N to a centre of circle O are spaced an angular distance of 120° and 60° apart. Between the points P and Q of the saddle-shaped coil 13 there is preferably connected a tuning capacitor C whose impedance is such that the resonant circuit formed by the saddle-shaped coil 13 and the capacitor C behaves substantially as an open circuit at frequencies in the vicinity of 50 Hz.

In order to prevent electromagnetic radiation from the deflection element 13 to the horizontal deflection device 11 and the first deflection element 12 of the vertical deflection device 11', the second deflection element 13 of the vertical deflection device 11' is shielded by a grounded shielding electrode 16. Via capacitive and inductive coupling to the shielding electrode 16, the second deflection element 13 constitutes, in conjunction with the shielding electrode 16, a network as shown in FIG. 5a. Therein, the oscillator 17 is formed by an alternating current source, one terminal of which is connected to ground. The second deflection element 13 is represented as a coil having a self-inductance L which is connected to the terminals of the alternating current source 17 by way of terminals p and q. The shielding electrode 16 is represented as two capacitors having a capacitance C/2 and a self-inductance $L_c$. The impedance at the point p with respect to ground is formed by the coil L parallel to a series connection of the first capacitor C/2 and the parallel connection of the self-inductance $L_c$ and the second capacitor C/2 as shown in FIG. 5b. The resonance frequency of the circuit shown in FIG. 5b is approximately:

$$\sqrt{\frac{1}{C\left(L_c + \frac{L}{2}\right)}} \text{ rad } s^{-1}$$

For values of C, L and $L_c$ amounting to 200 pF, 200 nH and 10 nH, respectively, the resonance frequency amounts to 34 MHz.

FIG. 6a illustrates how the alternating voltage source 17 is inductively coupled, via two coils $L_{T1}$ and $L_{T2}$, to the second deflection element 13 which is again represented by a coil having a self-inductance L. Because of the symmetry of the circuit, no current will flow from the point s and the point s will carry substantially ground potential. As appears from FIG. 6b, the impedance of the circuit in the point p with respect to ground is given by the parallel connection of the first capacitor C/2 and the series connection of the coil L and the second capacitor C/2. The resonance frequency of this circuit is approximately:

$$\frac{2}{\sqrt{LC}}$$

For values of L and C amounting to 200 nH and 200 pF, respectively, the resonance frequency amounts to 50 MHz. The higher resonance frequency prevents interference between the second deflection element and the video signals generated by the television pick-up tube.

I claim:

1. An image pick-up system, comprising a television pick-up tube (1) and a deflection voltage unit (18) which is connected to the television pick-up tube, the television pick-up tube comprising an electron source (3) for emitting an electron beam to an image pick-up face (7), a horizontal deflection device (11) for deflecting the electron beam across the image pick-up face along an image line, and a vertical deflection device (11') for deflecting the electron beam in a direction transversely of the image line, the vertical deflection device (11') comprising a first deflection element (12) and a second deflection element (13) which is of an electromagnetic type and which operates at a frequency which is higher than that of the first deflection element, characterized in that the deflection voltage unit (18) comprises an AC supply source (17), a first coil ($L_{T1}$) whose terminals are connected to terminals of the AC supply source (17), and a second coil ($L_{T2}$) whose terminals are connected to terminals of the second deflection element (13), the first and the second coil being inductively coupled to one another.

2. An image pick-up system as claimed in claim 1, characterized in that the second deflection element (13) is capacitively coupled to a current-conductive shielding electrode (16) which is connected to a reference voltage.

3. A deflection voltage unit suitable for use in an image pick-up system as claimed in claim 1 or 2.

4. An X-ray examination apparatus comprising an image pick-up system as claimed in claim 1 or 2.

* * * * *